(12) United States Patent
Vichniakov et al.

(10) Patent No.: US 12,741,734 B2
(45) Date of Patent: Sep. 22, 2026

(54) VAPOR SEAL ELEMENT, VAPOR SEAL ASSEMBLY AND METHOD OF MANUFACTURING A VAPOR SEAL ELEMENT

(71) Applicant: Airbus Operations GmbH, Hamburg (DE)

(72) Inventors: Alexei Vichniakov, Hamburg (DE); Lenard Wohlsen, Hamburg (DE); Genís Löptien Guix, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 19/227,810

(22) Filed: Jun. 4, 2025

(65) Prior Publication Data

US 2025/0376256 A1 Dec. 11, 2025

(30) Foreign Application Priority Data

Jun. 7, 2024 (EP) .................................... 24180696

(51) Int. Cl.
*B64C 3/24* (2006.01)
*B29D 99/00* (2010.01)
*B29K 101/12* (2006.01)

(52) U.S. Cl.
CPC ........... *B64C 3/24* (2013.01); *B29D 99/0053* (2013.01); *B29K 2101/12* (2013.01)

(58) Field of Classification Search
CPC .... B64C 3/24; B29D 99/0053; B29K 2101/12
See application file for complete search history.

(56) References Cited

U.S. PATENT DOCUMENTS

| | | | | |
|---|---|---|---|---|
| 2012/0098212 | A1* | 4/2012 | Bogiatzis ............. | B64D 37/005 277/637 |
| 2017/0320588 | A1* | 11/2017 | Briand ................... | B64D 37/06 |
| 2019/0061285 | A1* | 2/2019 | Hentschel ............... | B29C 43/18 |

OTHER PUBLICATIONS

European Search Report for corresponding European Patent Application No. 24180696.7 dated Oct. 15, 2024.

* cited by examiner

*Primary Examiner* — Justin M Benedik
(74) *Attorney, Agent, or Firm* — Greer, Burns & Crain, Ltd.

(57) ABSTRACT

A vapor seal element including at least one substantially planar base body and at least one reinforcing member and at least one seal arranged on the base body. The base body with the at least one reinforcing member and the at least one seal positioned thereon is configured as a one-piece, self-supporting panel with the base body, the reinforcing member and the seal being formed from a thermoplastic material. A vapor seal assembly including a plurality of vapor seal elements, a vehicle provided with at least one vapor seal element and a method of manufacturing a vapor seal element are also provided.

19 Claims, 2 Drawing Sheets

VAPOR SEAL ELEMENT, VAPOR SEAL ASSEMBLY AND METHOD OF MANUFACTURING A VAPOR SEAL ELEMENT

CROSS-REFERENCES TO RELATED APPLICATIONS

This application claims the benefit of European Patent Application Number 24180696.7 filed on Jun. 7, 2024, the entire disclosure of which is incorporated herein by way of reference.

FIELD OF THE INVENTION

The present invention pertains to a vapor seal element, a vapor seal assembly a vehicle provided with at least one vapor seal element and a method of manufacturing a vapor seal element.

BACKGROUND OF THE INVENTION

Although it can be used in many applications, the present invention and the problems underlying it are explained in greater detail in relation to aircraft. However, the devices and methods described can likewise be used in vehicles in all sectors of the transport industry, e.g., for road vehicles, for rail vehicles or for watercraft or other installation environments.

The general purpose of a vapor seal in a vehicle, particularly in an aircraft, is to contain and control the escape of vapors—typically fuel vapors—to ensure safety, integrity, and efficiency of the vehicle's operation. In aircraft several installations require provision of a vapor seal. A particular relevant vapor seal is located underneath a center wing box of the aircraft. The center wing box typically contains integral fuel tanks. A vapor seal prevents fuel vapors from escaping these tanks and migrating into other parts of the aircraft, such as the fuselage or passenger cabin. In particular the vapor seal provided underneath a center wing box is generally formed by a foil and has to be installed with a total of several hundred pieces such as reinforcement and fixation means and must be fixed with more than 1000 single assembly parts. The vapor seal underneath the center wing box of an aircraft covers the total area of the center wing box. Manual installation of the foil and the assembly parts leads to a long installation time and requires the operator to work in an environment with limited space and under unfavorable ergonomically conditions, mostly in overhead work.

SUMMARY OF THE INVENTION

Against this background, it is an object of the present invention to find a vapor seal element which can be manufactured in a simple and efficient manner, and which can be installed in an ergonomically advantageous way thereby fully complying with the requirements of the vapor seal.

According to a first aspect of the invention, a vapor seal element comprising at least one substantially planar base body and at least one reinforcing means or member and at least one seal arranged on the base body is provided, wherein the base body with the at least one reinforcing means and the at least one seal positioned thereon is designed as a one-piece, self-supporting panel with the base body and the reinforcing means being formed from a thermoplastic material. This has the advantage that a pre-assembled vapor seal element is provided that allows installation in a shorter time and with reduced efforts as well as lower ergonomical impact on operators during installation. A further advantage is that a light-weight element can be provided that fulfils all requirements with respect to vapor sealing and heat protection and can at the same time be adapted precisely to the geometrical conditions of the installation location.

A further aspect of the invention lies in a vapor seal assembly comprising a plurality of vapor seal elements, wherein the vapor seal elements are interconnected or connectable to form a self-supporting panel-like structure. This has the advantage that a vapor seal can be provided that is pre-assembled and pre-configured for the location of installation. The vapor seal assembly eliminates the need of providing a high number of assembly parts and allows for efficient positioning and installation.

A further aspect of the invention lies in a vehicle comprising at least one vapor seal element or at least one vapor seal assembly. This has the advantage that manufacturing time and costs for the vehicle can be significantly reduced by using a pre-assembled and pre-configured vapor seal.

A further aspect of the invention lies in a method of manufacturing a vapor seal element, comprising the steps of providing a substantially flat self-supporting base body consisting of a thermoplastic material, positioning at least one reinforcing means and at least one seal consisting of a thermoplastic material on the base body and materially bonding the at least one reinforcing means and the at least one seal with the base body. This has the advantage that the vapor seal having all installation means required implemented can be manufactured remote from the location of installation in an efficient and time saving manner. Furthermore, overall weight and manufacturing complexity of the vapor seal can be reduced by forming the entire vapor seal from a thermoplastic material.

According to an embodiment of the invention, the thermoplastic material is configured as a fiber-reinforced, in particular glass fiber-reinforced thermoplastic material. This has the advantage of allowing the manufacture of the vapor seal element as well as the final vapor seal assembly as a self-supporting structure with enhanced stability and durability thereby allowing a configuration and shaping of the vapor seal elements during manufacture.

According to an embodiment of the invention, the thermoplastic material is selected from the group consisting of polyphenylene sulfide (PPS), polyetherimide (PEI), polyaryl ether ketone (PAEK), low-melt polyaryl ether ketone (LM-PAEK), polyether ether ketone (PEEK) or polyether ketone ketone (PEKK), in particular wherein the reinforcing means, the seal and the base body each consist of or comprise the same or of compatible thermoplastic material. This has the advantage that a selection of a material that fulfils the requirements at the location of installation, e.g., with respect to durability, corrosion resistance and tightness of the seal can be made when manufacturing the vapor seal. The aforementioned materials also provide enhanced thermal stability and allow a production of the vapor seal element and assembly with inherent heat shielding thus eliminating the need to include or affix separate heat-shields on or in specific regions of the vapor seal during or after installation.

According to a further embodiment of the invention, the reinforcing means and seal are materially connected to the base body by one of thermoplastic welding, adhesive bonding and co-consolidating thermoforming. This has the advantage that the vapor seal assembly can be pre-configured and produced remote from the final location of installation with enhanced manufacturing efficiency and reduced number of manufacturing steps. The vapor seal bearing all components can be manufactured from the same or compatible materials in the distinct parts and thus also reduces weight and manufacturing complexity of the vapor seal.

According to a further embodiment of the invention, the base body has at least one perforation and at least one reinforcing means is arranged in the region of the at least one perforation, in particular fully or partially enclosing the perforation. This has the advantage that depending on the location of installation the base body can be pre-configured during manufacture and provided with the reinforcing means attached or installed during manufacture. This reduces error rates installation and increases work efficiency and quality.

According to a further embodiment of the invention method, the reinforcing means is configured as a rail- or bar shaped fastening means having a longitudinal extension with respect to a surface of the base body. This has the advantage that means supporting installation of the vapor seal in the final sealing location are included in the vapor seal during manufacture, eliminating the need of supplying additional fastening means during manufacture. The overall product quality and adaptation of the vapor seal can be enhanced during manufacture of the one-piece-vapor seal element and labor efficiency during installation of the vapor seal be significantly increased. This reduces manufacturing time and costs and allows for an ergonomic work process during installation of the vapor seal.

According to a further embodiment of the invention, the base body is provided as a pre-formed or pre-shaped base body. This has the advantage that the vapor seal can be adapted to the requirements of the installation position in a vehicle or aircraft prior to installation or during manufacture. The vapor seal can be manufactured taking into consideration the geometrical circumstances at the installation position and thus allow for providing a vapor seal that is ready for installation. Pre-forming or pre-shaping can include bending or providing cut-outs in the base body or edge region of the base body.

According to a further embodiment of the invention the vapor seal assembly comprises a plurality of vapor seal elements, wherein the vapor seal elements are interconnected or connectable to form a self-supporting panel-like structure. This has the advantage that a vapor seal assembly can be manufactured that consists of several smaller vapor seal elements combined to form the vapor seal with the required size and configuration. The manufacturing efficiency is enhanced since the vapor seal elements can be pre-configured and finished and combined into a final vapor seal assembly. Without limiting the invention thereto, connection of the vapor seal elements to form the vapor seal assembly before or during installation, e.g., in an aircraft, a vehicle or an environment demanding provision of a vapor seal can be established by means of material bonding such as adhesive bonding or thermoplastic welding or by using mechanical connection means such as clips, screws, bolts or piped or keder rails provided in the edge regions of the vapor seal elements.

According to a further embodiment of the invention vehicle, the vapor seal assembly is formed from a plurality of vapor seal elements prior to or during an installation in the vehicle. This has the advantage that installation and manufacturing efficiency is enhanced since in a first option, the vapor seal in its entirety can be provided pre-assembled and transferred to the location of installation, whereas in the second option the single vapor seal element can be transferred to the location of installation of the vapor seal and combined into the final vapor seal assembly by connection the elements during installation of the vapor seal in the location.

According to a further embodiment of the invention, the vehicle is an aircraft, with the vapor seal assembly being, in particular, positioned below a center wing box of the aircraft. This has the advantage that a vapor seal can be provided in a simple and efficient way fulfilling the purpose of efficient sealing. In particular, in the center wing box of an aircraft, the efforts to provide a vapor seal preventing fuel vapors from migrating between different compartments of the aircraft and ensuring the integrity and safety of the fuel system is increased. The invention vapor seal elements, as well as the vapor seal assembly, also reduces the manufacturing time and can be installed with reduced impact on operators working under limited space and thus ergonomically demanding installation conditions. The handling and fixing of a plurality of single parts is eliminated and misalignment of parts as well as installation errors are avoided.

According to a further embodiment of the invention method, at least one perforation is introduced in the base body in the region of the at least one reinforcing means before or after the positioning of the at least one reinforcing means. This has the advantage that during manufacture a base body is provided that is pre-configured by implementing perforations needed, e.g., for installing the vapor seal in a final assembly location having several elements, such as hooks, eyelets or levers passing through the base body and vapor seal before attaching the reinforcing means. In a second option the reinforcing means can be connected to the base plate and the perforations be introduced after connection, e.g., by cutting or milling, to finish the vapor seal element. The invention encompasses both options.

According to a further embodiment of the invention method, materially bonding of the at least one reinforcing means with the base body is carried out by one of thermoplastic welding, adhesive bonding and co-consolidating thermoforming of the base body and the at least one reinforcing means. This has the advantage that the manufacturing efficiency is significantly increased since the requirement of installing reinforcing means during installation of the vapor seal in the vehicle or aircraft is eliminated due to integration into an upstream work step that can be completed in a place remote from the final installation position of the vapor seal. This allows for preassembly of the vapor seal element and eliminates a plurality working steps which have to be made in some circumstances under conditions such as workplaces with limited space and in overhead working positions.

According to a further embodiment, the invention method comprises the step of connecting two or more vapor seal elements to form a planar or sheet-like self-supporting vapor seal assembly, in particular, as described before. This has the advantage that a single pre-assembled vapor seal can be provided that can be handled by an operator in an ergonomically favorable manner and allows for decreasing installation time and efforts.

BRIEF DESCRIPTION OF THE DRAWINGS

The invention will be explained in greater detail with reference to exemplary embodiments depicted in the drawings as appended.

Figure 1:
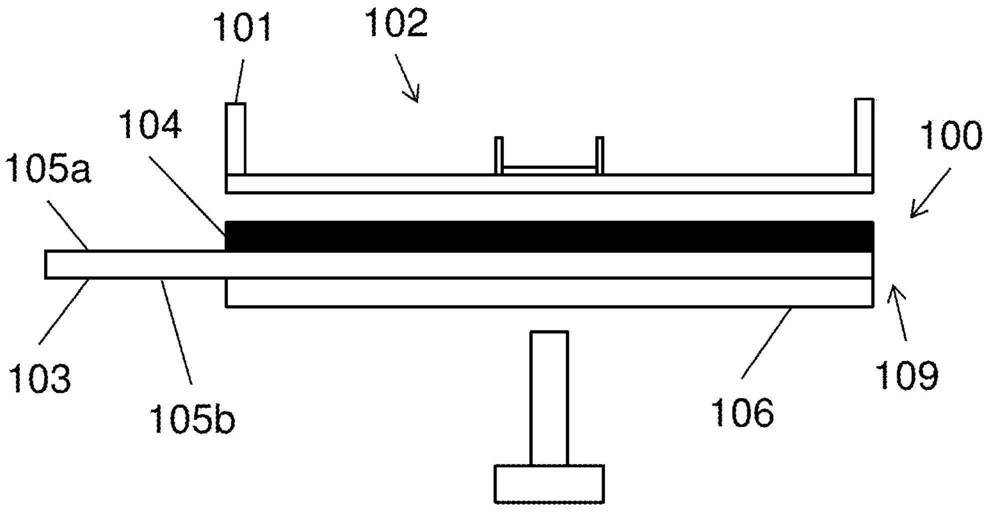
FIG. 1 schematically depicts an arrangement of a vapor seal assembly according to an embodiment of the invention.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the detailed description. The elements of the drawings are not necessarily to scale relative to each other. In the figures, like reference numerals denote like or functionally like components, unless indicated otherwise.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

In the figures of the drawings, identical elements, features, and components that have the same function, and the same effect are each given the same reference signs, unless otherwise specified.

DETAILED DESCRIPTION OF THE PREFERRED EMBODIMENTS

FIG. 1 schematically depicts an arrangement of a vapor seal assembly 100 according to an embodiment of the invention in an aircraft 102. The vapor seal assembly 100 is installed underneath a center wing box 101 of an aircraft 102 and comprises a base body 103 as well as a reinforcing means or member 106 and a seal 104 connected to the base body 103. The preinstalled seal 104 is provided on a first surface 105*a* of the base body 103 facing the center wing box 101. On the opposite second surface 105*b* of the base body 103 the reinforcing means 106 is installed that surrounds perforations 107 in the base body 103 or supports the edge region 109 of the base body 103. The base body 103, the seal 104 and the reinforcing means 106 are connected in a co-consolidation thermoforming process before installing the vapor seal assembly 100 in the aircraft 102. The vapor seal assembly 100 is provided as a self-supporting plate- or sheet-like element that is transferred to an installation position within the aircraft 102 in a preassembled and preconfigured state and affixed to the aircraft fuselage. The base body 103, seal 104 and reinforcing means 106 consist of or comprise a thermoplastic material that is provided with reinforcing fibers, in particular glass fibers embedded in a thermoplastic matrix. The vapor seal assembly 100 or single vapor seal elements 108*a, b, c* forming the vapor seal assembly 100 are manufactured in a single processing step thereby connecting the seal 104 as well as the reinforcing means 106 to the base body 103 by co-consolidating thermoforming. In the embodiment of FIG. 1, the thermoplastic material was selected in accordance with the forming process and allowed the use of consolidating thermoforming during manufacturing. As an alternative it is also possible to apply a manufacturing process involving two or more steps, with a step of preparing, i.e., pre-shaping and pre-configurating the base body 103 and in a further step connecting the reinforcing means 106 and the seal 104 with the surfaces 105*a, b* of the base body 103. The vapor seal assembly 100 or independently manufactured single vapor seal elements 108*a, b, c* connected to form the final vapor seal assembly 100 can also be manufactured in a one-shot molding process. A connection between the reinforcing means 106, the seal 104 and the base body 103 can also be established by thermoplastic welding or adhesive bonding, without limiting the invention thereto. The invention also allows a combination of several manufacturing methods. The manufacturing method is selected based on the material properties of the elements to be joined and the requirements with respect to bonding set by the installation environment of the finished vapor seal assembly 100. While it is possible to produce the vapor seal assembly 100 or the vapor seal elements 108*a, b, c* combined to form the vapor seal assembly 100 from the same thermoplastic material, the invention also encompasses the use of different materials in the respective elements and thus allows for adaptation of the properties of vapor seal assembly 100 with respect to requirements during use of the vapor seal.

Figure 2:
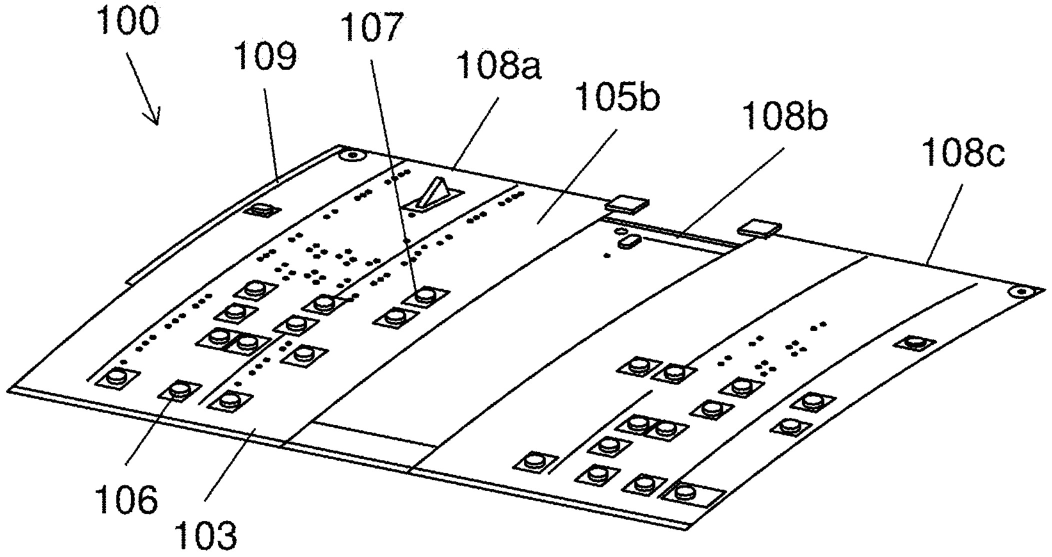
FIG. 2 schematically depicts a vapor seal assembly according to an embodiment of the invention.

FIG. 2 schematically depicts a vapor seal assembly 100 according to an embodiment of the invention for installation in a center wing box 101 of an aircraft 102. The vapor seal assembly 100 consists of or comprises a total of three vapor seal elements 108*a, b, c* combined to form the plate-like vapor seal assembly 100 for installation in the aircraft 102. FIG. 2 depicts the surface 105*b* of the vapor seal assembly 100 facing away from the center wing box 101 once the vapor seal is installed. The vapor seal elements 108*a, b, c* are manufactured independently and combined in the vapor seal assembly 100 before installation. Due to the formation of the vapor seal elements 108*a, b, c* from a thermoplastic material the overall weight of the vapors seal is reduced. The vapor seal assembly 100 can thus be handled by a low number of operators and be installed in an ergonomically favorable and fast installation process. Since fixation means, reinforcing means 106 and seals 104 installed in the planar surface 105*a, b* and the edge region 109 are provided during manufacture of the vapor seal elements 108*a, b, c* and are preinstalled in the vapor seal assembly 100 or vapor seal elements 108*a, b, c* the plurality of handling steps necessary in standard vapor seal installations using a foil and several hundred fixation and reinforcing means as well as seals that must be mounted independently, are eliminated.

Figure 3:
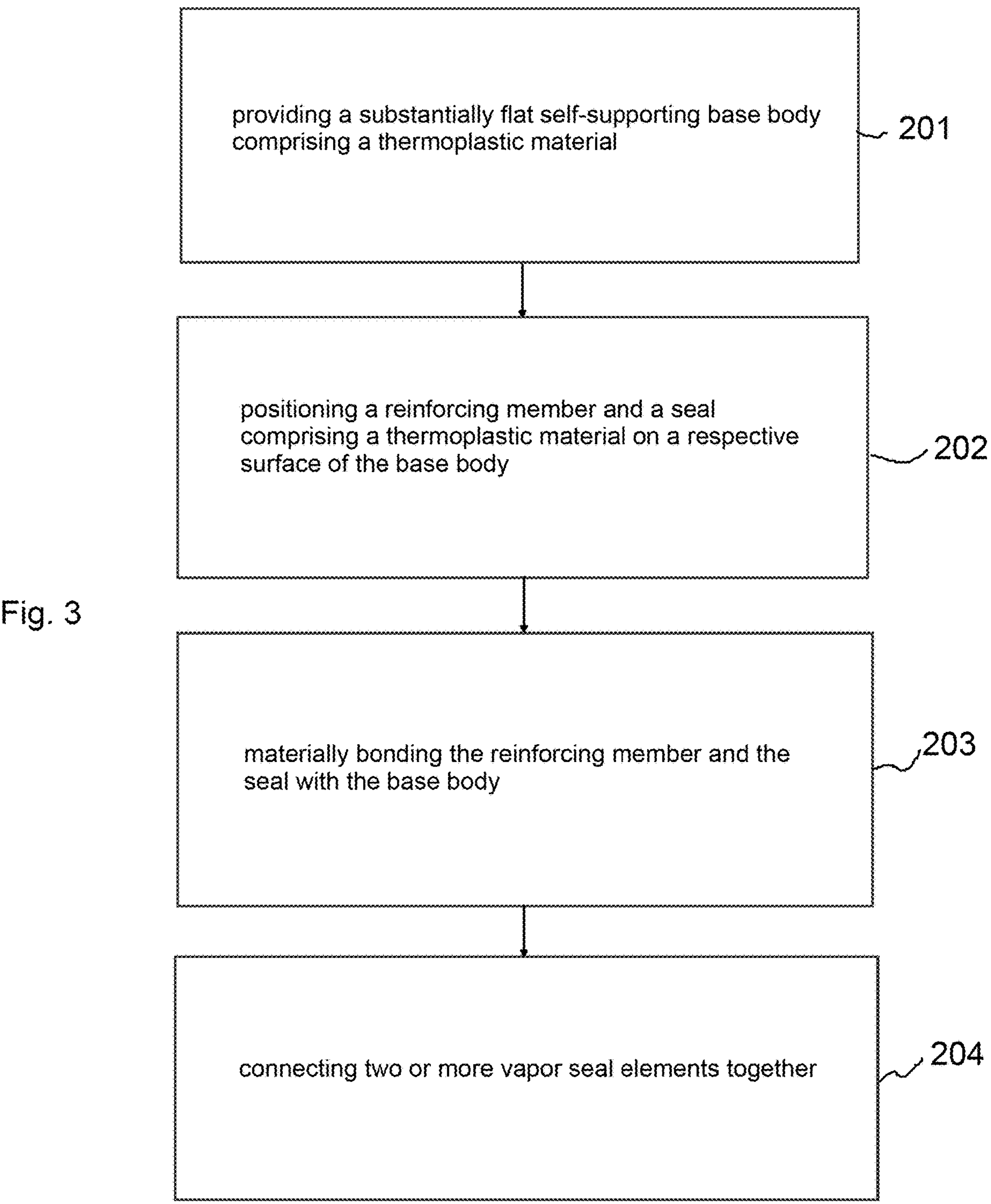
FIG. 3 schematically depict a flowchart of a method of manufacturing a vapor seal element according to an embodiment of the invention.

FIG. 3 schematically depict a flowchart of a method of manufacturing a vapor seal element 108*a, b, c* according to an embodiment of the invention. The method comprises a step 201 of providing a substantially flat base body 103 consisting of or comprising a thermoplastic material. The base body 103 is self-supported and provides a stability and rigidity to the vapor seal element 108*a, b, c* manufactured therefrom. The base body 103 however still has a certain flexibility to be bend and adapted to the installation environment, e.g., in an aircraft 102 during installation. Since the base body 103 itself is self-supported, it can be handled and transported in an easy manner without the need of using additional material handlers or fixing or transportation means. In a next step 202 at least one reinforcing means 106 and optionally a seal 104 consisting of or comprising the same thermoplastic material as the base body 103 or a thermoplastic material compatible thereto, is positioned on the base body 103 in a region specified by the configuration of the installation position of the final vapor seal. The reinforcing means 106 and the seal 104 can be positioned on the same or opposing surfaces 105*a, b* of the base body 103. After positioning the elements of the vapor seal element 108*a, b, c*, i.e., the base body 103, the reinforcing means 106 and the seal 104, those are materially bonded in a further step 203. In this step 203, the method of bonding is selected depending on the material of the elements and the configuration or geometry of the vapor seal element 108*a, b, c*. Methods of bonding encompassed by the invention are thermoplastic welding and adhesive bonding of the base body 103 and the reinforcing means 106 and seal 104 or co-consolidating thermoforming of the vapor seal element 108*a, b, c* comprising all elements in a single manufacturing step using, e.g., a molding device. In a further step 204 two or more vapor seal elements 108*a, b, c* are connected with each other, e.g., by means of material bonding such as adhesive bonding or thermoplastic welding or by using mechanical connection means such as clips, screws, bolts or piped or keder rails provided in the edge regions 109 of the vapor seal elements 108*a, b, c* to form the vapor seal assembly before or during installation, e.g., in an aircraft 102, vehicle or an environment demanding provision of a vapor seal.

In the foregoing detailed description, various features are grouped together in one or more examples or examples with the purpose of streamlining the disclosure. It is to be understood that the above description is intended to be illustrative, and not restrictive. It is intended to cover all alternatives, modifications, and equivalents. Many other examples will be apparent to one skilled in the art upon reviewing the above specification. The embodiments were chosen and described to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 vapor seal assembly
101 center wing box
102 aircraft
103 base body
104 seal
105*a, b* surface
106 reinforcing means or member
107 perforation
108*a, b, c* vapor seal element
109 edge region
201 step
202 step
203 step
204 step

The invention claimed is:

1. A vapor seal element comprising:

at least one substantially planar base body having a first surface and a second surface and at least one reinforcing member installed as a first layer directly on the second surface, and at least one seal arranged directly on the first surface of the base body in axial alignment with the at least one reinforcing member as a second layer on the base body, wherein the base body is located between the at least one reinforcing member and the at least one seal, and the base body, the at least one reinforcing member, and the at least one seal are in an overlapping relationship in locations where the at least one seal and the at least one reinforcement member are directly on the second and first surfaces of the base body, respectively, wherein the base body with the at least one reinforcing member and the at least one seal positioned thereon is configured as a one-piece, self-supporting panel with the base body, the reinforcing member and the seal being formed from a thermoplastic material.

2. The vapor seal element according to claim 1, wherein the thermoplastic material is configured as a fiber-reinforced thermoplastic material.

3. The vapor seal element according to claim 1, wherein the thermoplastic material is selected from the group consisting of polyphenylene sulfide (PPS), polyetherimide (PEI), polyaryl ether ketone (PAEK), low-melt polyaryl ether ketone (LM-PAEK), polyether ether ketone (PEEK) or polyether ketone ketone (PEKK).

4. The vapor seal element according to claim 3, wherein the reinforcing member, the seal and the base body each are comprised of the same thermoplastic material or of compatible thermoplastic materials.

5. The vapor seal element according to claim 1, wherein the reinforcing member and the seal are materially connected to the base body by one of a thermoplastic welding, an adhesive bonding, or a co-consolidating thermoforming.

6. The vapor seal element according to claim 1, wherein the base body has at least one perforation and the at least one reinforcing member is arranged in a region of the perforation.

7. The vapor seal element according to claim 6, wherein the at least one reinforcing member is arranged fully or partially enclosing the perforation.

8. The vapor seal element according to claim 1, wherein the reinforcing member is configured as a rail- or bar-shaped fastening means having a longitudinal extension with respect to a surface of the base body.

9. The vapor seal element according to claim 1, wherein the base body is provided as a pre-formed or pre-shaped base body.

10. The vapor seal assembly comprising a plurality of vapor seal elements according to claim 1, wherein the vapor seal elements are interconnected or connectable to form a self-supporting panel-like assembly structure.

11. A vehicle comprising at least one vapor seal element according to claim 1.

12. A vehicle comprising at least one vapor seal assembly according to claim 8.

13. The vehicle according to claim 12, wherein the vapor seal assembly is formed from a plurality of vapor seal elements prior to or during an installation in the vehicle.

14. The vehicle according to claim 12, wherein the vehicle is an aircraft.

15. The vehicle according to claim 14, wherein the vapor seal assembly is positioned below a center wing box of the aircraft.

16. A method of manufacturing a vapor seal element according to claim 1, comprising the steps of providing a substantially flat self-supporting base body comprising a thermoplastic material, positioning at least one reinforcing member comprising a thermoplastic material on a first surface of the base body and at least one seal comprising a thermoplastic material on a second surface of the base body opposite the first surface, and materially bonding the reinforcing member and the seal with the base body.

17. The method according to claim 16, wherein at least one perforation is introduced in the base body in a region of positioning the at least one reinforcing member before or after the positioning of the at least one reinforcing member.

18. The method according to claim 16, wherein materially bonding of the at least one reinforcing member and the at least one seal with the base body is carried out by one of thermoplastic welding, adhesive bonding and co-curing thermoforming of the base body, the reinforcing member and the seal.

19. The method according to claim 16, comprising a step of connecting two or more of said vapor seal elements together.

* * * * *